May 16, 1967  D. H. THORBURN  3,319,644
PNEUMATIC CONTROL UNIT
Filed Jan. 19, 1965  3 Sheets-Sheet 1

Inventor:
David H. Thorburn,
Hume, Groen, Clement + Hume
Attys

United States Patent Office 3,319,644
Patented May 16, 1967

3,319,644
PNEUMATIC CONTROL UNIT
David H. Thorburn, Oak Park, Ill., assignor to The Powers Regulator Company, Skokie, Ill., a corporation of Illinois
Filed Jan. 19, 1965, Ser. No. 426,623
18 Claims. (Cl. 137—85)

This invention pertains to a pneumatic control unit and in particular to a unit for converting an analog signal into a digital signal in which the latter operates a suitable control mechanism.

The concept of converting analog signals into a digital signal is well known, particularly in the electrical arts. In fact, this concept has been applied in a limited sense in the pneumatic arts. However, such converters have not been practical in the pneumatic arts because of the lack of adequate feedback. Adequate feedback is necessary to cause the cessation of output signals once an appropriate change has been made in the system to compensate for the change in the sensed variable.

One of the advantages of a digital output signal is that it may be utilized to operate devices which are relatively insensitive to the pressure effects of the control medium. For example, in an air conditioning system where the temperature is controlled by hot or cold water and the flow rate is regulated in a manner proportional to the temperature, the practice is to control the flow rate by means of a motor valve. In a conventional system the motor valve is controlled by means of an analog pressure signal which is generated by suitable relays acting in response to signals emanating from a temperature sensing device. The difficulty with such a motor valve is that the pressure effects of the water react against the control pressure signals so as to cause inconsistencies in the degree of opening of the valve for a given pressure signal. Furthermore, in most systems should the motor valve become jammed, a change in opening will not be effected even though there is a change in the pressure signal. This is the case even though the system has feedback.

The digital type of system permits the use of motor valves which are substantially unaffected by pressure. For example, the motor valve may take the form of a gate valve in which the valve is opened and closed by means of rotation of a threaded stem. The pressure effects on such a valve are negligible, and it is well known that the rotation of the stem a predetermined number of revolutions causes the valve to be opened a predetermined amount.

In view of the foregoing, one of the foremost features and objects of the invention is a pneumatic signal generating device which is adapted to convert an analog signal into a corresponding digital signal.

Another feature and object of the invention resides in the provision of a signal generating device adapted to convert an analog signal into a pneumatic digital signal.

A still further feature and object of the invention resides in the provision of a signal generator which is adapted to convert pneumatic analog signals into pneumatic digital signals which may be utilized for operating control units.

A still further feature and object of the invention resides in the provision of a pneumatic signal generating device adapted to convert pneumatic analog signals into pneumatic digital signals in the form of one or more serial pneumatic pulses. Such pulses may be utilized to operate control units such as those types adapted to control the heating or cooling medium in an air conditioning unit.

A still further feature and object of the invention resides in the provision of a pneumatic signal generating device adapted to convert analog signals to digital signals and having a negative feedback loop for discontinuing the generation of digital signals after an appropriate number have been admitted to effect the desired change.

A still further feature and object of the invention is the provision of a signal generating device for generating a series of pressure pulses at a frequency proportional to the magnitude of an input signal.

It is a specific object of the present invention to provide a pressure pulse generating device comprising first means for generating on signal a series of pressure pulses, second means for applying an input signal to the first means such that the first means is activated to generate one or more pressure pulses, and third means for applying a negative feedback signal to the first means to de-activate the first means.

The aforementioned features and objects of the invention along with others will be apparent upon reading of the specification with reference to the following drawings.

Figure 1:
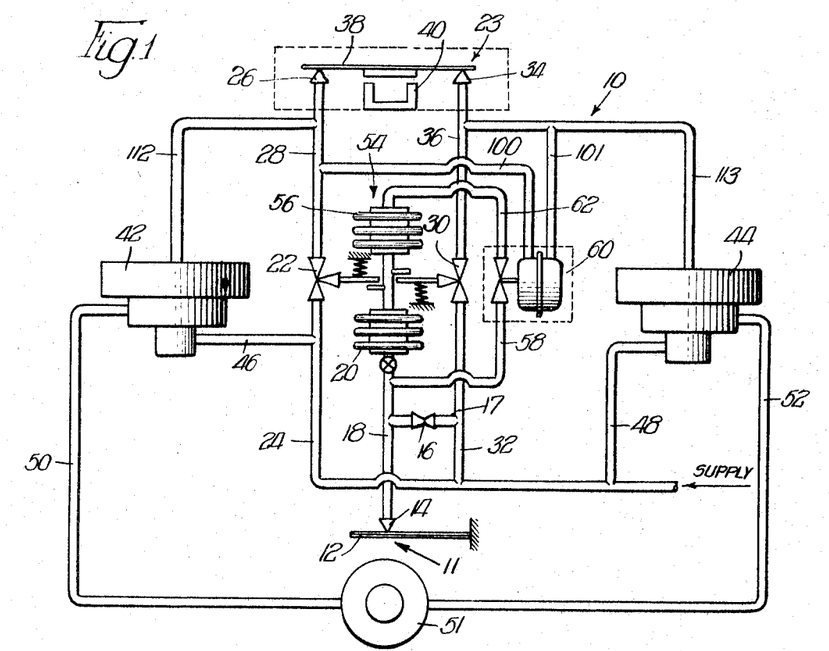
FIGURE 1 is a schematic illustration of a preferred system embodying the invention.

Referring now to FIGURE 1 there is shown a schematic illustration of one preferred form of the invention. For purposes of convenience the invention at various times will be described as used in conjunction with specific types of control systems such as those used in the heating and cooling. It will be understood that such specific references are by way of example and are not to be construed as limitations. The subject invention may be utilized wherever it will perform in the manner intended and provide the desired results.

As shown in FIGURE 1 the invention includes a signal generating unit generally denoted by the numeral 10 as will be described hereinafter. The signal generating unit is connected to a suitable analog type of signal transmitter such as the flapper nozzle arrangement 11.

The flapper nozzle arrangement 11 consists of a nozzle 14 which is connected to a conventional source of supply pressure via conduits 17, 32, and 24. A restriction 16 is mounted in the conduit 17. The nozzle 14 is adapted to exhaust to atmosphere with the exhaust being controlled by the flapper 12. The flapper 12 may be a bi-metallic unit adapted to deflect in accordance with sensed temperature. As the flapper 12 moves toward the nozzle 14, the exhaust therefrom is restricted so that the pressure in the conduit 18 on the downstream side of the restriction 16 is increased. As the flapper 12 moves away from the nozzle 14, the exhaust is less restricted so that the pressure on the downstream side of the restriction 16 is decreased. In this manner, an analog pressure signal commensurate with sensed temperature is generated.

The signal generating unit 10 is connected to the flapper nozzle arrangement by the input signal conduit 18 so that the analog signal is communicated thereto. In the signal generating unit 10, the analog signals are communicated to a pressure sensing device such as the bellows 20. The bellows 20 is adapted to extend and contract in accordance with the pressure received therein. As shown schematically in FIGURE 1, the bellows 20 is mechanically connected with a restrictor valve 22 for moving the same between open and closed positions. Exemplary mechanical constructions for the bellows and restrictor valves assembly and other components of the system will be described hereafter.

The restrictor valve 22 is connected to a source of supply pressure by the conduit 24 and to a nozzle 26 in the pulse former 23 by a conduit 28. The restrictor valve 22 is adapted to move between variably open and closed positions. When the system is at equilibrium the restrictor valve 22 will be closed.

A similar restrictor valve 30 is connected to the supply conduit 24 by a conduit 32 and to a nozzle 34 in the pulse former 23 by a conduit 36.

The nozzles 26 and 34 are adapted when in an open position to exhaust to atmosphere. The nozzles, however, are normally closed by means of a flapper or flappers 38 biased into engagement therewith. The biasing means may take any suitable form such as a magnet 40 as indicated in FIGURE 1 or a spring or the like.

The conduits 28 and 36 are respectively connected to a pair of pulse amplifying valves 42 and 44. The pulse amplifying valves 42 and 44 are in turn connected to the supply conduit 24 by conduits 46 and 48, respectively, and are of the type adapted to receive and amplify a pressure signal a predetermined amount. Such amplifying valves may consist of a series of diaphragms in which the input signal acts upon a large diaphragm and the output signal is produced by the responsive action of a smaller diaphragm whereby the amplification is a function of the ratio of the areas of the diaphragm. One form of amplifying valve usable in this system will be described hereinafter with reference to FIGURE 7. The pulse amplifying valves 42 and 44 are connected by the conduits 50 and 52 for communicating the amplified signals to a suitable actuator 51 which will be described hereinafter with reference to FIGURE 6.

The signal generator 10 further includes a negative feedback circuit generally denoted by the numeral 54. The feedback circuit 54 includes a feedback bellows 56 which is mounted in opposing relationship to the input signal bellows 20 and a conduit 58 which is connected at one end to the analog signal input conduit 18 and at its other end to a pulse operated valve 60. The valve 60 is normally closed but is adapted to be operated by pressure pulses between open and closed positions. The valve 60 is connected by the conduit 62 to the bellows 56.

Figure 5:
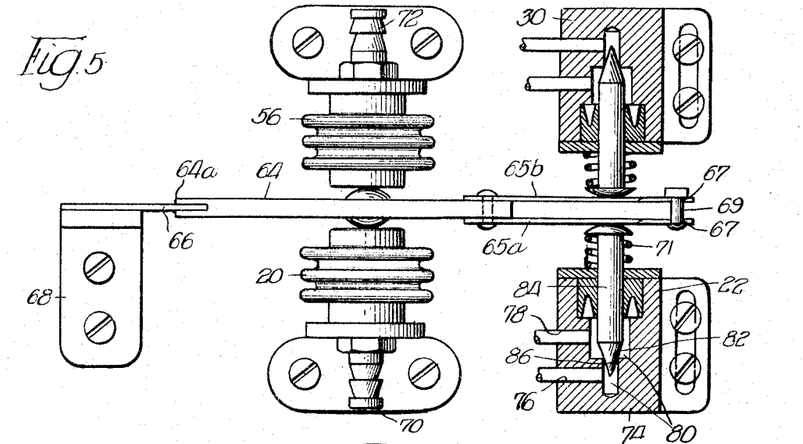
FIGURE 5 is an elevational view of a balance bellows and restrictor valves assembly suitable for use in the system shown in FIGURE 1.

Referring now to FIGURE 5 there is shown an exemplary arrangement for a bellows 20 and 56 and restrictor valves 22 and 30 assembly. Specifically, the bellows 20 and 56 are mounted in opposing relationship and in abutment with the lever 64. The lever 64 is mounted at one end 64a so that it may be flexed or pivoted both upwardly and downwardly. In this instance the lever 64 is secured to a flexure pivot consisting of a leaf spring 66 which is secured to a suitable mounting bracket 68. The bellows 20 and 56 are provided with ports 70 and 72, respectively, for connection with their respective conduits 18 and 62. The input analog signal is communicated to the interior of the bellows 20 through the conduit 18 and the port 70.

The lever 64 at its outer end is composed of bifurcated leaf springs 65a and 65b which are riveted at one end to the lever 64. The springs 65a and 65b are provided with apertures 67 in which is slidably mounted the headed pin 69. The leaf spring 65a abuts the restrictor valve 22 and the leaf spring 65b abuts restrictor valve 30.

As will be seen later on, when the lever 64 is pivoted upwardly, the spring 65b is flexed downwardly since the valve 30 is in its closed position and the valve 22 is permitted to open. Conversely when the lever 64 is flexed downwardly by the spring 65a is flexed upwardly since valve 22 is closed and valve 30 is permitted to open. Thus, the lever and bifurcated spring assembly provides selective opening and closing of the restrictor valves 22 and 30 depending on the resultant force exerted on the lever 64 by the opposing bellows 20 and 56.

The restrictor valves 22 and 30 are substantially identical and reference will be made to the former. The restrictor valve 22 comprises a casing 74 having the inlet port 76 and the outlet port 78. The ports are connected by the chamber 80 having an annular seat 82 therebetween. A spring-biased needle valve member 84 cooperates with the annular seat 82 to control the flow between the inlet and outlet ports 76 and 78. Specifically, the valve member 84 is provided with a conical portion 86 which permits variation in the flow by longitudinal movement of the valve member.

The valve member 84 is biased by the leaf spring 65a into a closed position and is normally closed when the system is at equilibrium. When the bellows 20 senses an increase in the signal pressure, it is expanded against the bellows 56 whereby the lever 64 is forced upwardly and the restrictor valve 22 is opened. Conversely when the bellows 20 senses a decrease in signal pressure it contracts due to the force of bellows 56 whereby the lever 64 is flexed downwardly. When this happens, the restrictor valve 30 is opened and the valve 22 remains closed. Thus, the valves 22 and 30 are connected to the lever 64 for single directional movement so that when the lever 64 is flexed in the upward direction only the valve 22 is acted upon and when flexed in the downward direction only valve 30 is acted upon.

Figures 2, 3:
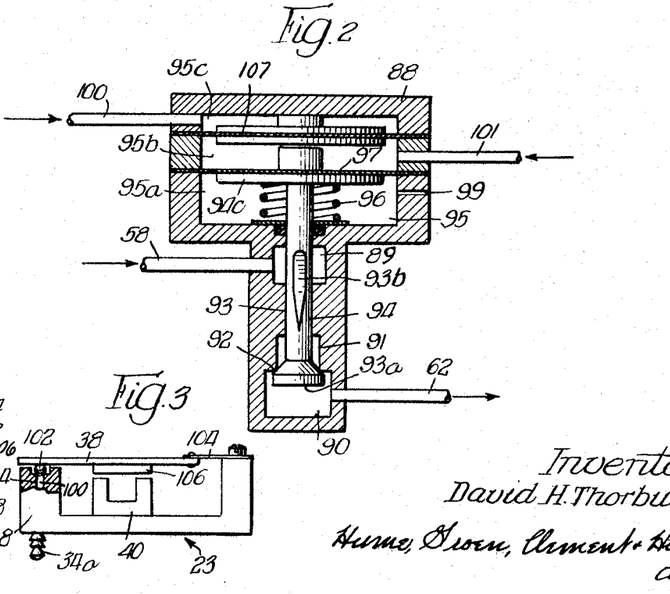
FIGURE 2 is a cross-sectional view of a pulse operated valve suitable for use in the system shown in FIGURE 1.
FIGURE 3 is a side elevational view, partially in section, of a pulse generator.

The pulse operated valve 60, as illustrated in FIGURE 2, comprises a casing 88, a first valving chamber 89 connected to the conduit 58, and a second valving chamber 90 connected to the conduit 58, and a second valving chamber 90 connected to the conduit 62. The valve chamber 90 is connected to a third valving chamber 91 through a valve seat 92. A bore 93 extends from the third valving chamber 91 through the first valving chamber 89. A stem 94 is slidably mounted in the bore 93 and is provided with a headed end 93a which cooperates with the valve seat 92. The stem 94 is further provided with a metering groove 93b which is closed when the valve seat 92 is closed by the headed end 93a. When the stem 94 is moved downwardly so as to unseat the headed end 93a, the groove 93b is also moved downwardly so as to connect the chambers 89 and 91. As a result, the pneumatic fluid is then permitted to flow down the conduit 58 through the chamber 89, the metering groove 93b, the chamber 91, the chamber 90, and into the conduit 62, in that order. As will be seen later on, the order in some instances may be reversed in that the flow will be from conduit 62 to the conduit 58.

The valve 60 is actuated through a spring-loaded diaphragm assembly disposed within an enclosure 95 defined by the casing 88 and includes a coil spring 96 which is confined between a shoulder 94c on the stem 94 and the casing 88 so as to bias the stem upwardly. The enclosure 95 is divided into three compartments 95a, 95b, and 95c by the diphragms 97 and 107. The diaphragms are of the usual type in that they are clamped at their edges and are impervious to the pneumatic fluid and are adapted to be flexed by an unbalance in pressure. The compartment 95a is maintained at atmosphere by the vent 99 whereas the compartments 95b and 95c are connected to the conduits 28 and 36 by the branch conduits 100 and 101, respectively. Thus, when one of the nozzles 26 and 34 operates to cause a pulse in its associated conduit 28 or 36, the pulse is also communicated to the appropriate compartment in the pulse operated valve 60. This causes the valve to momentarily open for the duration of the pulse so that there is flow between the conduits 58 and 62.

When the input signal into the line 18 is represented by an increase in pressure, the flow will be through the valve 60 from conduit 58 to the conduit 62 and the bellows 56. The valve 60 is constructed so that normally several pulses will be necessary before the entire increase in pressure is transmitted to the bellows 56. This, of course, is a matter of design and adjustment. If the signal is a decrease in the input pressure, the flow would be in the opposite direction through the valve 60 from conduit 58 to the conduit 62 and the conduit 18. Again, a number of pulses is required before the pressure within the bellows 56 decreases an amount sufficient to equalize it with the pressure in the conduit 18. It should also be noted that the flow rate through the valve 60 between the conduits 58 and 62, and consequently the time required for pressure equalization across the valve 60, is dependent on the extent to which the metering groove 93b in the stem 93 is moved downward and this, in turn, is dependent on the pressure level in the active compartment 95b or 95c as determined by the number of pulses which have been transmitted to the compartment.

In order to minimize movement of the bellows 20 due to bleed of pneumatic fluid from the bellows 20 when the valve 60 is opened, the bellows 20 is preferably larger than the volume of the bellows 56. The effective areas of the bellows 20 and 56 are preferably the same, however. In practice, it may also be found desirable to include a restriction 21 between the bellows 20 and the conduit 58 to further minimize the bleed effect on the bellows 20 when the valve 60 is opened.

Figure 4:
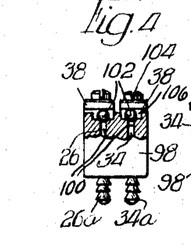
FIGURE 4 is a front elevational view, partially in section, of the pulse generator of FIGURE 3.

The pulse-forming, nozzle armature magnet assembly 23 is shown in FIGURES 3 and 4. Specifically, the assembly comprises the casing 98 having the nozzles 26 and 34 which are adapted to be connected to the lines 28 and 36, respectively, by fittings 26a and 34a. The nozzles 26 and 34 each include a bore 100 which extends through the casing 98 and is open at one end with the fittings 26a or 34a and at the other end to atmosphere. A ball valve member 102 is mounted on the upper ends of each of the bores 100. The ball members 102 are each held in their seated position by a flapper lever 38 which is pivotally attached to the casing 98 by the pivot 104. Intermediate the ends of each lever 38 is a magnetically permeable armature 106 which cooperates with the magnet 40. The magnet 40 attracts the armatures 106 and in turn the levers 38 so that the latter bias the ball members 102 toward their seated position.

When the system is at equilibrium, the pressure within both nozzles 26 and 34 is normally at or equal to atmosphere. In fact, the nozzles may be provided with a bleed notch so as to insure atmospheric pressure therein during equilibrium conditions. When either nozzle is connected to the source of supply pressure by the openings of the associated restrictor valve 22 or 30, the pressure increases therein until it is sufficient to overcome the attraction between the magnet 40 and the associated armature 106. When this happens, the associated lever 38 is forced upwardly and the ball member 102 associated with the nozzle under pressure is lifted from its seat so that the nozzle is exhausted to atmosphere. Upon a reduction in pressure the armature 106 returns to its normal position with the associated valve member 102 in its seated position. The pressure may then again begin to build up until it is sufficient to overcome the magnetic force. A series of pulses are thus formed by the opening and closing of the affected nozzle.

The rate of build-up within the nozzle 26 or 34 is a function of the opening within the associated restrictor valve 22 or 30 since the supply pressure remains essentially constant. The further open the restrictor valve the less time required for the build-up of pressure within the nozzle. As set forth previously, the degree of opening of the restrictor valve is proportional to the magnitude of the change in pressure representing the input signal to the system. Thus a relatively large change in input signal causes the restrictor valve to be opened a greater extent with a consequent increase in the frequency of the pulses.

Figure 7:
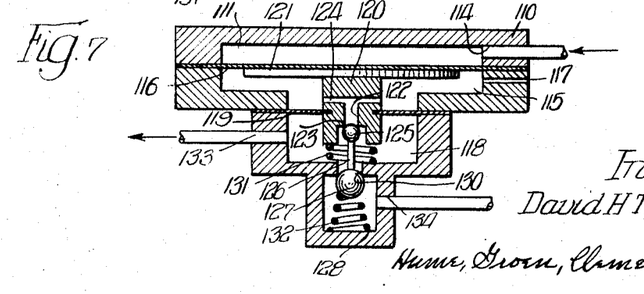
FIGURE 7 is a sectional view of a pneumatic pulse amplifier.

The structure of the pulse amplifiers 42 and 44 is illustrated in FIGURE 7. Each pulse amplifier comprises a casing 110 provided with a control pressure chamber 111 connected by a port 114 to one of the branch conduits 112 or 113 from conduits 28 and 36, respectively. The control pressure chamber 111 is separated from an exhaust chamber 115 by a diaphragm 116. The exhaust chamber is maintained at atmospheric pressure by a vent 117 in the casing 110. The exhaust chamber 115 is, in turn, separated from an output pressure chamber 118 by a diaphragm 119, in which a valving member 120 is centrally mounted. The valving member 120 is provided with an annular shoulder 121 at its upper end which is affixed to the diaphragm 116. At is lower end disposed in the chamber 118, the valving member 120 is provided with a central bore 122 adapted to communicate with chamber 118 at its lower end and communicating with chamber 115 via radial bores 124 at its upper end. The lower end of the bore 122 is provided with a valve seat 123 which is cooperative with the ball end 125 of a valve member 126. The lower ball end 127 is cooperative with a valve seat 129 in a bore 130 adapted to provide communication between chambers 128 and 118. The valving member 120 is biased upwardly by a compression spring 131 disposed in the chamber 118. The valve member 126 is also biased upwardly by a compression spring 132 disposed in the chamber 128. A port 134 connects the chamber 128 with supply pressure via conduit 24 or 48, and a port 133 connects the chamber 118 to the actuator 51 via conduit 50 or 52.

The operation of the pulse amplifying valves is as follows. With the control pressure chamber 111 at or near atmospheric pressure, the valving member 120 is forced upwardly by the bias spring 131 so as to open the bore 122 to maintain the output pressure chamber 118 at atmospheric pressure, and the bore 130 is closed by the ball end 127 forced into seating engagement by the bias spring 132. However, when a pressure increase is communicated to the control pressure chamber 111 via the bore 114, the valving member 120 is forced downwardly by downward flexure of the diaphragm 116 so as to close the bore 122 by engaging the ball end 125 in the valve seat 123 and open the bore 130 by unseating the ball end 127. In this manner a pressure pulse is produced in the output pressure chamber 118 and transmitted via the bore 133.

Figure 6:
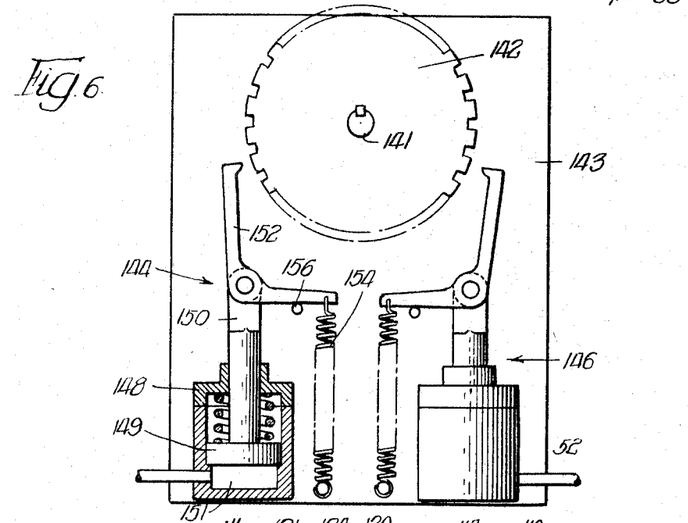
FIGURE 6 is an elevational view, partially in section, of a pulse responsive actuator.

Referring now to FIGURE 6, there is shown an actuator 51 of the type adapted to be used in the inventive system. The actuator 51 includes a shaft 141 mounted for rotation in a suitable plate or frame 143 and adapted to be connected to a suitable control device (not shown) such as a gate valve which may be opened and closed by rotating the shaft 141. A ratchet wheel 142 is keyed to the shaft 141 to provide means for rotating the shaft. The wheel 142 is driven by the drive assemblies 144 and 146 which are substantially identical except that they are mounted for selective driving of the wheel 142 in opposite rotational directions. Hence, only one drive assembly need be described.

The drive assembly 144 includes a conventional single-acting spring-return motor 148 which is connected to the line 50 so as to receive the pulses from that side of the system. The motor 148 includes a piston 149 affixed to a piston rod 150 which is caused to be extended outwardly by an increase in pressure within the pressure chamber 151. An L-shaped pawl arm 152 is pivotally attached at its bend to the rod 150. The arm 152 is biased toward the wheel 142 by a tension spring 154. When the piston 150 is in its non-extended position the arm 152 is prevented from engaging the wheel 142 by the pin 156. As the piston is extended the arm 152 rotates until it engages the wheel 142. Continued extension of the piston 152 rotates the wheel 142 in a clockwise direction. Each pulse causes the piston rod 150 to extend and withdraw. Thus, a series of pulses causes the wheel 142 to be driven an equal number of steps in the clockwise direction. When the motor 146 is actuated, the wheel 142 is driven in counter-clockwise direction but otherwise in the same manner as with motor 144. By selectively actuating motors 144 and 146, the control drive may be opened and closed as needed.

The operation of the system of FIGURE 1 can now be described. When the input pressure is increased, the bellows 20 is forced into an extended condition whereby the restrictor valve 22 is opened a commensurate amount. When this happens pressure is communicated to the nozzle 26. The valve 22 is constructed so that even at full open position there is an inherent drop in pressure. This drop in pressure causes a delay in the build-up of pressure within the nozzle 26 and the adjoining conduit 28. Ultimately, however, the pressure within the nozzle 26 will approach supply pressure or at least a pressure level that is sufficient to force the flapper 38 upward and ball member 102 from its seated position. The pressure within the nozzle is then immediately reduced at a rate depending upon the size of the nozzle 26 opening.

The reduction in pressure permits the flapper 38 to return to its normal position at which time the pressure begins to repeat the build-up portion of the cycle. The increase in pressure and the subsequent reduction is transmitted to the pulse amplifying valve 42 which is actuated to cause a corresponding amplification of the increase in pressure. The increase and subsequent decrease in pressure constitute a pulse which in turn is communicated through the conduit 50 to the actuator 51. Each pulse represents a predetermined amount of movement of the actuator 51. For example, if the actuator 51 connects with a valve which moves between its open and closed positions by rotation then each pulse could represent, for example, a quarter of a turn. Thus, if the input signal dictated that the valve be rotated a full turn, the signal system would generate approximately four pulses.

It would be understood that the pulse amplifying valves 42 and 44 could be omitted where the pulses generated by the system are of sufficient strength to perform the desired operations. The pulse amplifying valves are principally for amplification and to permit the adaptation of the system for various forms of utilization. The pulse amplifying valves also serve to amplify the volume of air transmitted which in the pulse generating portion of the system is limited due to the use of the restrictor valves 22 and 30.

In addition to each of the pulses formed by the nozzle 26 being transmitted to the pulse amplifying valve 42, they are also transmitted to the pulse operated metering valve 60. As explained previously, each pulse causes the valve 60 to open a predetermined amount and permit a portion of the pressure signal to be metered to the bellows 56. The portions of the pressure passed by the valve 60 are successively accumulated by the bellows 56 which thereby successively expands to bias the lever 64 back toward its normal position. When the pressure within the bellows 56 has become substantially equal to that within the bellows 20, the lever 64 will be returned to its equilibrium position. This will permit the valve 22 to return to its closed position and the system is again at equilibrium or quiescence.

Should the control pressure within the line 18 decrease, the bellows 20 would contract. This would cause the lever 64 to move downwardly so as to open the restrictor valve 30. Pressure would then be communicated to the nozzle 34, and it would cooperate with its associated lever 102 in the manner described previously. The resultant pulses would be communicated to the pulse amplifying valve 44 and, in turn, from the valve 44 through the conduit 52 to the actuator 51. The pulses communicated through the conduit 52 would drive the actuator 51 in the opposite direction from those pulses received from the line 50. The feedback circuit 54 operates in the same manner except that the flow of pneumatic fluid through the metering valve 60 is from conduit 62 to conduit 58. Hence, the information represented by the pressure decrease signal is metered to and accumulated by the bellows 56 in the sense that the bellows 56 now successively contracts to bias the restrictor valve 30 toward closure.

If the system were utilized, for example, as part of a heating unit and an increase in input pressure in the conduit 18 from the normal equilibrium pressure caused by an undesirable increase in temperature, the pulses in the conduit 50 would cause the actuator 51 to rotate so as to close the heating control valve to reduce the flow of hot water. Conversely, if there were a decrease in input pressure in the conduit 18 due to an undesirable decrease in temperature, the pulses in the conduit 52 would cause the actuator 51 to rotate so as to open the heating control valve to increase the flow of hot water.

Figure 8:
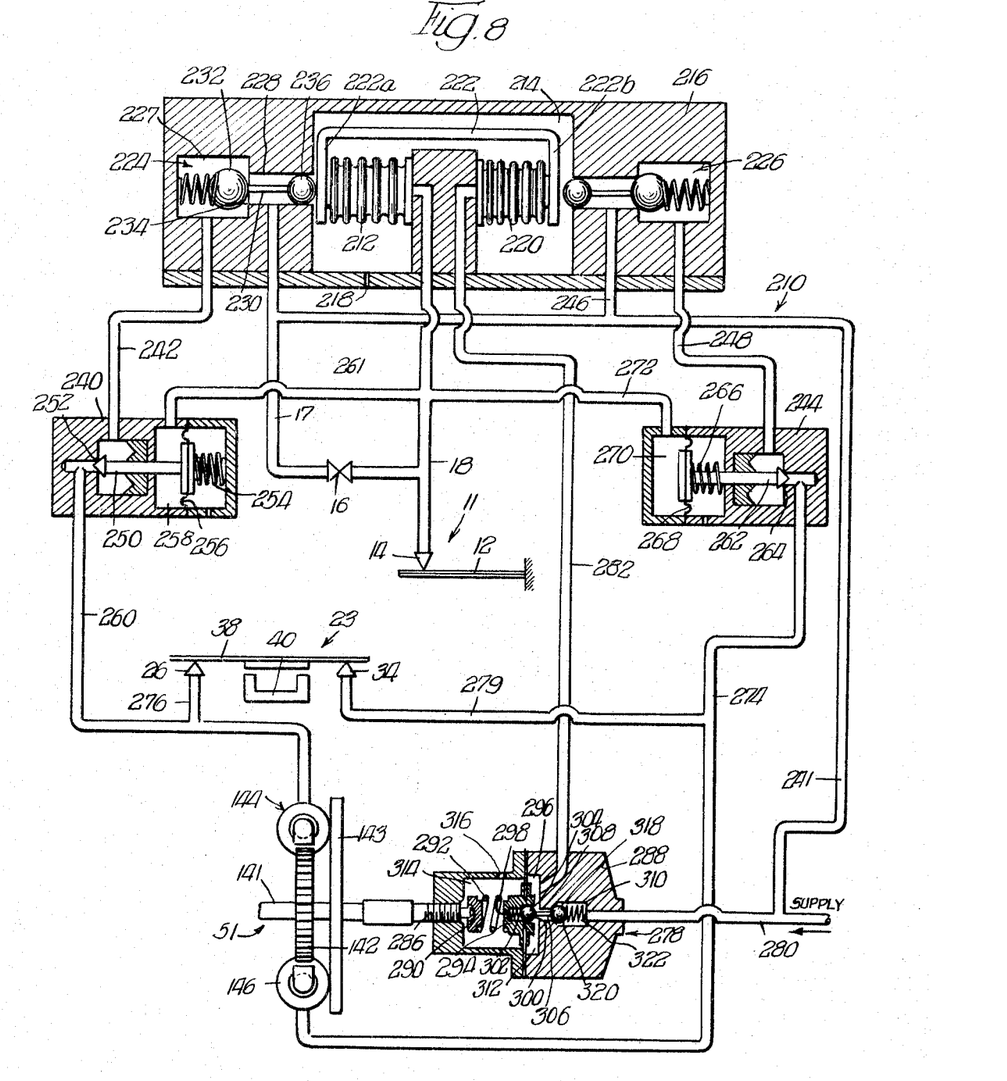
FIGURE 8 is a schematic illustration, partially in section, of another preferred system embodying the invention.

Turning now to FIGURE 8, another preferred system embodying the invention is shown schematically. The signal generating unit generally designated by the numeral 210 is responsive to input signals from a flapper nozzle arrangement 11 which is substantially identical to the flapper nozzle arrangement of FIGURE 1 and includes the bi-metal flapper 12 regulating the nozzle 14 which is connected to supply pressure via the branch conduit 17 and its in-line restrictor 16. The input pressure signals are transmitted to the signal generating unit 210 by the conduit 18 which in this system is connected to an input bellows 212 disposed in a chamber 214 defined by a casing 216. The chamber 214 is maintained at atmospheric pressure by a vent 218. Also disposed in the chamber 214 is a bellows 220 which forms part of the negative feedback circuit.

A U-shaped member 222 is disposed for reciprocal movement in the chamber 214 with its legs 222a and 222b fastened to the excursion ends of the bellows 212 and 220 respectively. Thus, the bellows 212 and 220 are interconnected in opposition such that expansion of one of the bellows 212 and 220 exerts a compression force on the other bellows and such that contraction of one of the bellows enables expansion of the other bellows.

The casing 216 further houses a pair of valves 224 and 226 which are disposed at opposite ends of the chamber 214 for operation by the member 222. The valves 224 and 226 are substantially identical in structure. Hence, only the former will be described in detail.

The casing 216 defines a chamber 227 for the valve 224. A valve member 230 disposed in a bore 228 extending from the chamber 214 into the chamber 224 is provided with a ball end 232 which is disposed in the chamber 227 and which is cooperative with the valve seat 234 in the bore 228. The valve member 230 is further provided with a second ball end 236 which is disposed for travel in the bore 228. The length of the valve member 230 is such that, when the ball end 232 is seated in the valve seat 234, the ball end 236 protrudes slightly into the chamber 214. Hence, expansion of the bellows 212 causing impingement of the leg 222a of the member 222 against the ball end 236 unseats the ball end 232 from the valve seat 234 against the bias of a compression spring 236.

Supply pressure is communicated to the bore 228 via the branch conduit 17 connected to the supply conduit 238. The chamber 227 is connected to restrictor valve 240 by a conduit 242. Thus, opening of the valve 224 by expansion of the bellows 212 causes the transmission of supply pressure to the restrictor 240. Communication of supply pressure from the bore 228 to the chamber 214 is precluded by the sealing effect of the ball end 236 in the bore 228.

In similar manner, opening of the valve 226 by contraction of the bellows 212 effects the transmission of supply pressure to the restrictor valve 244 via the path comprising conduit 241, conduit 246, valve 226, and conduit 248.

When the system is in equilibrium, the bellows 212 and 220 are balanced and both valve 224 and 226 are closed.

The restrictor valves 240 and 244 are conventional pressure-operated variable restriction valves which may be of a construction similar to that illustrated in FIGURE 8. The valves 240 and 244 differ in respect that valve 240 is responsive to a pressure increase in the input signal conduit 18 to open whereas the valve 244 is responsive to a pressure decrease in the input signal conduit 18 to open.

The restrictor valve 240 comprises a needle valve member 250 biased into seating engagement in a valve seat 252 by a compression spring 254. A diaphragm 256 isolates a pilot pressure chamber 258 such that a pressure increase in the input conduit 18 transmitted to the chamber 258 by a conduit 261 opens the restrictor valve an amount proportional to the magnitude of the pressure increase in the conduit 18. The resultant flow through the restrictor valve 240 to the conduit 242 causes a pressure build-up in the conduit 260.

The restrictor valve 244 comprises a needle valve member 262 which is urged toward an unseated position with respect to the valve seat 264 by the compression spring 266. The valve 244 further comprises a diaphragm 268 which isolates a pilot pressure chamber 270. Normal equilibrium pressure in the conduit 18 transmitted to the chamber 270 by the conduit 272 is sufficient to overcome the force of the spring 266 and maintain the valve 244 closed. However, a pressure decrease in the input signal conduit 18 below equilibrium pressure enables the spring 266 to overcome the opposing force exerted by the pressure-loaded diaphragm 268 so as to open the valve an amount proportional to the magnitude of the pressure decrease in the conduit 18. The resultant flow through the restrictor valve 244 from the conduit 248 causes a pressure build-up in the conduit 274 at a rate proportional to the magnitude of the pressure decrease in the input signal conduit 18.

A pulse-forming, nozzle armature magnet assembly 23 is coupled to the conduits 260 and 274 by branch conduits 276 and 279, respectively. In all respects, the pulse-forming, nozzle assembly 23 is the same as that described with reference to FIGURES 3 and 4 with like reference numerals indicating like parts. As shown, the nozzle 26 is connected to the conduit 276 and the nozzle 34 is connected to the conduit 279. The nozzle assembly acts in the manner previously described with reference to the FIGURE 1 embodiment to form a series of pressure pulses to the conduit 260 when that conduit is activated by the opening of the restrictor valve 240 and alternatively to form a series of pressure pulses in the conduit 274 when that conduit is activated by the opening of the restrictor valve 244. The pressure pulses generated by the nozzle assembly operate the actuator 51 in the manner previously described with reference to FIGURE 6.

The negative feedback circuit of the FIGURE 8 embodiment comprises the bellows 220, a conventional variable pressure valve 278 which is mechanically coupled directly to the shaft 141, a supply pressure input conduit 280 to the valve 278, and a feedback conduit 282 interconnecting the valve 278 and the bellows 220.

The variable pressure valve 278 includes a stem 286 which is threaded in a casing 288 and which abuts against a member 290 engaged in one end of the adjusting spring 292. The opposite end of the adjusting spring 292 bears against a member 294 centrally mounted in a flexible diaphragm 296. The member 294 is provided with a bore 298 extending centrally therethrough and including a valve seat 300. A compression spring 302 is mounted in the bore 298 so as to bias the ball end 304 of the valve member 306 away from the valve seat 300. The valve member 306 is disposed in a bore 308 in the casing 288 which extends between the supply pressure chamber 310 and the outlet pressure chamber 312. The diaphragm 296 separates the outlet pressure chamber 312 from the exhaust chamber 314 which is maintained at atmospheric pressure by a vent 16. A second ball end 318 for the valve member 306 is disposed in the supply pressure inlet chamber 310 and is cooperative with the valve seat 320. A compression spring 322 biases the ball end 318 toward seating engagement in the valve seat 320.

As indicated, pneumatic fluid at supply pressure is transmitted to the supply pressure chamber 310 via the conduit 280. The outlet pressure from the chamber 312 is communicated to the conduit 282 at a pressure level which is determined by the positioning of the stem 286. Thus, when the ratchet wheel 142 of the actuator 51 is rotated so as to cause inward movement of the stem 286, a force is exerted on the member 294 as a result of further compression of the spring 292 with the result that the ball end 304 is seated in the valve seat 300. Further inward movement of the stem 286 forces the ball end 318 to unseat. As pneumatic fluid accumulates in the outlet pressure chamber 312, it exerts a pressure on the diaphragm 296 in opposition to that of the adjusting spring 292. The accumulation of the pneumatic fluid chamber 312 continues until pressure level is raised to a point at which the valve is again in balance and the ball end 318 again seats in the valve seat 320 closing off further input of pneumatic fluid to the chamber 312 at supply pressure. Rotation of the stem 286 so that it moves outwardly produces an opposite effect whereby pneumatic fluid is exhausted from the outlet pressure chamber 312 through the bore 302 until the pressure level in the chamber 312 decreases to a point at which the valve 284 is again in condition of balance. In this manner, the valve 284 transmits a negative feedback signal via the conduit 282 to the bellows 220 which is indicative of the direction and amount of rotational movement of the actuator 51.

The operation of the system of FIGURE 8 is basically similar to that of the system of FIGURE 1. When the pressure in the input signal conduit 18 is increased above the normal equilibrium pressure level due, for example, to an increase in temperature sensed by the flapper valve transmitter 11, the bellows 212 is expanded causing the valve 224 to open to transmit supply pressure to the restrictor valve 240. At the same time, the pressure increase in the conduit 18 causes the restrictor valve 240 to open an amount proportional to the magnitude of pressure increase. The amount of opening of the restrictor valve 240 determines the rate of flow therethrough and, hence, the rate of pressure build-up in the conduit 260. When the pressure in the conduit 260 attains a level sufficient to force the flapper 38 upward and the associated ball member 102 from its seated position, the pressure in the conduit 260 drops to a point at which the build-up cycle begins again. In this manner, a series of pulses are transmitted to rotate the actuator ratchet wheel 142 an amount corresponding to the number of pulses. The rotation of the ratchet wheel, for example, might close a valve in a hot water heating system a proportional amount.

In response to rotation of the actuator ratchet wheel 142 produced by pulses in the conduit 260, the valve 284 transmits a negative feedback signal to the bellows 220 in the form of an increased pressure level indicative of the direction and amount of rotation of the ratchet wheel 142. The feedback pressure causes expansion of the bellows 222 and consequent forced contraction of the bellows 212 until the opposing bellows 222 and 212 are in an equilibrium condition at which time the generation of pressure pulses is discontinued.

A pressure decrease in input pressure conduit 18 below the quiescent pressure level causes a contraction of the bellows 212 and expansion of the bellows 220 which opens the valve 226 to transmit pneumatic fluid to the restrictor valve 244. Simultaneously, the pressure decrease opens the restrictor valve 244 to cause pressure build-up in the conduit 274 at a rate proportional to the magnitude of the pressure decrease in the conduit 18. In familiar fashion, the pulse generator forms a series of pulses which operate the actuator 51. In this instance, the negative feedback signal from the valve 284 takes the form of a decrease in pressure communicated to the bellows 220. When the bellows 220 and 212 again reach equilibrium, the generation of pulses in the conduit 274 is discontinued. Although no pulse amplifiers are specifically provided in FIGURE 8, it will be apparent that pulse amplifiers such as amplifiers 42 and 44 previously described with reference to FIGURES 1 and 7 may, if desired, be readily connected to the pulse conduits 260 and 274 for transmittal of amplified pressure pulses to the actuator 51.

From the foregoing descriptions of the FIGURE 1 and FIGURE 8 embodiments, it can now be seen that the present invention provides a unique pneumatic signal generator which is adapted to convert pneumatic analog signals into pneumatic digital signals for operating control units and which is particularly characterized by a salient "load adaptive" feature whereby the magnitude of the input error signal determines the speed of corrective action.

Although certain specific embodiments of the invention have been shown and described hereinabove, it is to be understood that this is merely by way of example and in no manner to be considered a limitation. It will be apparent that certain modifications may be made within the scope of the claims without departing from the spirit of the invention.

What is claimed is:

1. A pressure pulse generating device comprising: first means, including a first signal responsive portion and a second signal responsive portion, for generating in response to a predetermined signal applied to said first signal responsive portion serial pressure pulses and for deactivating in response to a negative feedback signal applied to said second signal responsive portion; second means for applying said predetermined signal to said first signal responsive portion of said first means such that said first means is activated to generate one or more serial pressure pulses; and third means for subsequently deriving and applying said negative feedback signal to said second signal responsive portion of said first means such that said first means is deactivated.

2. A pressure pulse generating device comprising: first means, including a first pressure responsive portion and a second pressure responsive portion, for generating in response to a predetermined pressure signal applied to said first pressure responsive portion serial pressure pulses at a frequency proportional to the magnitude of said predetermined pressure signal and for deactivating in response to a negative feedback pressure signal applied to said second pressure responsive portion; second means for applying said predetermined pressure signal to said first pressure responsive portion of said first means such that said first means is activated to generate one or more serial pressure pulses; and third means for deriving and applying said negative feedback pressure signal to said second pressure responsive portion of said first means, subsequent to the application of said predetermined pressure signal to said first pressure responsive portion of said first means, such that said first means is deactivated.

3. A pneumatic pulse generating device comprising: first means, including a first pressure responsive portion and a second pressure responsive portion, for generating in response to a predetermined pressure signal applied to said first pressure responsive portion serial pneumatic pulses at a frequency proportional to the magnitude of said predetermined pressure signal, each pulse consisting of an increase in pressure followed by a decrease in pressure, and for deactivating in response to a negative feedback pressure signal applied to said second pressure responsive portion; second means for applying said predetermined pressure signal to said first pressure responsive portion of said first means such that said first means is activated to one or more serial pneumatic pulses; and third means for subsequently deriving and applying said negative feedback pressure signal to said second pressure responsive portion of said first means to deactivate said first means.

4. A pressure pulse generating device comprising: first means, including a first signal responsive portion and a second signal responsive portion, for generating in response to a predetermined signal applied to said first signal responsive portion serial pressure pulses and for deactivating in response to said predetermined signal applied to said second signal responsive portion; second means for applying said predetermined signal to said first signal responsive portion of said first means such that said first means is activated to generate one or more serial pressure pulses; and third means for subsequently applying said predetermined signal to said second signal responsive portion of said first means such that said first means is deactivated.

5. A pressure pulse generating device comprising: first means, including a first pressure responsive portion and second pressure responsive portion, for generating in response to a predetermined pressure signal applied to said first pressure responsive portion serial pressure pulses at a frequency proportional to the magnitude of said predetermined pressure signal and for deactivating in response to said predetermined pressure signal applied to said second pressure responsive portion; second means for applying said predetermined pressure signal to said first pressure responsive portion of said first means such that said first said means is activated to generate one or more serial pressure pulses; and third means for applying at least a portion of said predetermined pressure signal to said second pressure responsive portion of said first means, subsequent to the application of said predetermined pressure signal by said second means to said first pressure responsive of said first means, such that said first means is deactivated.

6. A pneumatic pulse generating device comprising: first means, including a first pressure responsive portion and a second pressure responsive portion, for generating in response to a predetermined pressure signal applied to said first pressure responsive portion serial pneumatic pulses at a frequency proportional to the magnitude of said predetermined pressure signal, each pulse consisting of an increase in pressure followed by a decrease in pressure, and for deactivating in response to said predetermined pressure signal applied to said second pressure responsive portion; second means for applying said predetermined pressure signal to said first pressure responsive portion of said first means such that said means is activated to generate one or more serial pneumatic pulses; and third means for subsequently applying said predetermined pressure signal to said second signal responsive portion of said first means to deactivate said first means.

7. A pneumatic pulse generating device comprising: a source of supply pressure; a nozzle adapted to exhaust to atmosphere; a restrictor disposed intermediate said source of supply pressure and said nozzle for selectively connecting the same; a flapper biased into seating engagement with said nozzle; first signal responsive means for opening said restrictor to connect said source of supply pressure to said nozzle upon sensing a predetermined signal, the pressure in said nozzle increasing when said nozzle is connected to said source of supply pressure to force said flapper into a disengaged position whereby the nozzle is exhausted to atmosphere and the pressure therein is reduced to a level substantially equal to atmosphere, said flapper returning to its seated position with said reduction in pressure, the series of steps comprising increasing the pressure and then decreasing the pressure being continued as long as said source of supply pressure and said nozzle are connected; second signal responsive means for closing said restrictor to disconnect said source of supply pressure from said nozzle when said predetermined signal is applied to said second signal responsive means; and means for effecting delayed application of said predetermined signal to said second signal responsive means.

8. A pneumatic pulse generating device comprising: a source of supply pressure; a nozzle adapted to exhaust to atmosphere; a variable restrictor valve disposed intermediate said source of supply pressure and said nozzle for selectively connecting the same; a flapper biased into seating engagement with said nozzle; first signal responsive means for selectively opening said variable restrictor valve to connect said source of supply pressure to said nozzle upon sensing a predetermined signal, the pressure in said nozzle increasing when said nozzle connected to said source of supply pressure to force said flapper into a disengaged position whereby the nozzle is exhausted to atmosphere and the pressure therein is reduced to a level substantially equal to atmosphere, said flapper returning to its seated position with said reduction in pressure thereby completing the generation of a pressure pulse, the series of steps comprising increasing the pressure and then decreasing the pressure being continued as long as said source of supply pressure and said nozzle are connected; second signal responsive means for biasing said restrictor valve toward closure when said predetermined signal is applied to said second signal responsive means; and means for communicating said predetermined signal to said second signal responsive means subsequent to the generation of one or more pressure pulses.

9. A pneumatic device adapted to generate on signal one or more pulses each consisting of an increase in pressure followed by a decrease in pressure comprising: a source of supply pressure; a nozzle adapted to exhaust to atmosphere; a variable restrictor valve disposed intermediate said source of supply pressure and said nozzle for selectively connecting the same; a flapper biased into seating engagement with said nozzle; first pressure responsive means for selectively opening said variable restrictor valve to connect said source of supply pressure to said nozzle upon sensing a predetermined pressure signal, said variable restrictor valve being opened an amount proportional to the magnitude of said predetermined pressure signal whereby the flow through said variable restrictor valve is proportional to the magnitude of said signal, the pressure in said nozzle increasing when said variable restrictor valve is in an open position to force said flapper into a disengaged position whereby the nozzle is exhausted to atmosphere and the pressure therein is reduced, said flapper returning to its seated position with said reduction in pressure, the pulses constituting the increase in pressure and then decrease in pressure being serially continued as long as said source of supply pressure and said nozzle are connected; second pressure responsive means for biasing said variable restrictor valve toward closure when said predetermined pressure signal is applied to said second pressure responsive means; and means for metering portions of said predetermined pressure signal to said second pressure responsive means subsequent to the generation of one or more of said serial pulses, said second pressure responsive means being adapted to accumulate said metered portions of said predetermined pressure signal so as to successively increase bias on said variable restrictor valve until said variable restrictor valve is closed.

10. A pneumatic device adapted to generate on signal one or more pulses each consisting of an increase in pressure followed by a decrease in pressure comprising: a source of supply pressure; a nozzle adapted to exhaust to atmosphere; a variable restrictor valve disposed intermediate said source of supply pressure and said nozzle for selectively connecting the same; a flapper biased into seating engagement with said nozzle; first pressure responsive means for selectively opening said variable restrictor valve to connect said source of supply pressure to said nozzle in response to a predetermined pressure signal, said variable restrictor valve being opened an amount proportional to the magnitude of said predetermined pressure signal whereby the flow through said variable restrictor valve is proportional to the magnitude of said pressure signal, the pressure in said nozzle increasing when said nozzle is connected to said source of supply pressure to force said flapper into a disengaged position whereby the nozzle is exhausted to atmosphere and the pressure therein is reduced, said flapper returning to its seated position with said reduction in pressure, the pulses thereby generated being serially continued as long as said source of supply pressure and said nozzle are connected and at a rate which is a function of the magnitude of the opening of said variable restrictor valve; means for applying said predetermined pressure signal to said first pressure responsive means; second pressure responsive means for biasing said variable restrictor valve toward closure when said predetermined pressure signal is applied to said second pressure responsive means; and means for metering portions of said predetermined pressure signal to said second pressure signal responsive means in response to the generation of one or more of said serial pulses, said second pressure responsive means being adapted to accumulate said metered portions of said predetermined pressure signal so as to successively increase bias on said variable restrictor valve until said variable restrictor valve is closed.

11. A pneumatic device adapted to generate on signal one or more pulses each consisting of an increase in pressure and a decrease in pressure comprising: a source of supply pressure; a nozzle adapted to exhaust to atmosphere; a variable restrictor valve disposed intermediate said source of supply pressure and said nozzle for selectively connecting the same; a flapper biased into seating engagement with said nozzle; first pressure responsive means for selectively opening said variable restrictor valve to connect said source of supply pressure to said nozzle in response to a predetermined pressure signal, said variable restrictor valve being opened an amount proportional to the magnitude of said predetermined pressure signal whereby the flow through said variable restrictor valve is a function of the magnitude of said pressure signal, the pressure in said nozzle increasing when said nozzle is connected to said source of supply pressure to force said flapper into a disengaged position whereby the nozzle is exhausted to atmosphere and the pressure therein is reduced, said flapper returning to its seated position with said reduction in pressure, the pressure pulses thereby generated being serially continued as long as said source of supply pressure and said nozzle are connected and at a rate which is a function of the magnitude of the opening of said variable restrictor valve; means for applying said predetermined pressure signal to said first pressure responsive means; second pressure responsive means for biasing said variable restrictor toward closure when said predetermined pressure signal is applied to said second pressure responsive means; and a metering valve for metering a portion of said predetermined pressure signal to said second pressure signal responsive means in response to the generation of one or more of said serial pulses, said second pressure signal responsive means being adapted to accumulate said metered portions of said predetermined pressure signal so as to successively increase bias on said variable restrictor until said variable restrictor is closed.

12. A pneumatic device adapted to generate on signal one or more pulses each consisting of an increase in pressure followed by a decrease in pressure comprising: a source of supply pressure; a nozzle adapted to exhaust to atmosphere; a variable restrictor valve disposed intermediate said source of supply pressure and said nozzle for selectively connecting the same; a flapper biased into seating engagement with said nozzle; a first bellows connected to said variable restrictor valve such that flexure of said first bellows causes said variable restrictor valve to be correspondingly operated, said first bellows being adapted to flex in response to a predetermined pressure signal, said variable restrictor valve being correspondingly opened an amount proportional to the magnitude of said predetermined pressure signal whereby the flow through said variable restrictor valve is a function of the magnitude of said predetermined pressure signal, the pressure in said nozzle increasing when said nozzle is connected to said source of supply pressure so as to force said flapper into an unseated position whereby said nozzle is exhausted to atmosphere and the pressure therein is reduced, said flapper returning to its seated position with said reduction in pressure, the pressure pulses thereby generated being serially continued as long as said source of supply pressure and said nozzle are connected and at a rate which is a function of the magnitude of the opening of said variable restrictor valve; means for applying said predetermined pressure signal to said first bellows; a second bellows mounted in opposing relationship to said first bellows for biasing said restrictor valve toward closure when said predetermined pressure signal is applied to said second bellows; and a metering valve for metering a portion of said predetermined pressure signal to said second bellows in response to the generation of one or more of said serial pulses, said second bellows being adapted to accumulate said metered portions of said predetermined pressure signal so as to successively increase bias on said variable restrictor valve until said variable restrictor valve is closed.

13. A pneumatic pulse generating device comprising: a source of supply pressure; a nozzle adapted to exhaust to atmosphere; a valve disposed intermediate said source of supply pressure and said nozzle for selectively connecting the same; a restrictor disposed upstream of said nozzle for restricting the flow of pneumatic fluid thereto; a flapper biased into seating engagement with said nozzle; first signal responsive means for opening said valve to connect said source of supply pressure to said nozzle upon sensing a predetermined signal, the pressure in said nozzle increasing when said nozzle is connected to said source of supply pressure to force said flapper into a disengaged position whereby the nozzle is exhausted to atmosphere and the pressure therein is reduced to a level substantially equal to atmosphere, said flapper returning to its seated position with said reduction in pressure, the series of steps comprising increasing the pressure and then decreasing the pressure being continued as long as said source of supply pressure and said nozzle are connected; second signal responsive means for closing said valve to disconnect said source of supply pressure from said nozzle when a negative feedback signal is applied to said second signal responsive means; and means for effecting application of a negative feedback signal to said second signal responsive means.

14. A pneumatic pulse generating device comprising: a source of supply pressure; a nozzle adapted to exhaust to atmosphere; a valve disposed intermediate said source of supply pressure and said nozzle for selectively connecting the same; a restrictor disposed upstream of said nozzle for restricting the flow of pneumatic fluid thereto; a flapper biased into seating engagement with said nozzle; first signal responsive means for opening said valve to connect said source of supply pressure to said nozzle upon sensing a predetermined signal, the pressure in said nozzle increasing when said nozzle is connected to said source of supply pressure to force said flapper into a disengaged position whereby the nozzle is exhausted to atmosphere and the pressure therein is reduced to a level substantially equal to atmosphere, said flapper returning to its seated position with said reduction in pressure thereby completing the generation of a pressure pulse, the series of steps comprising increasing the pressure and then decreasing the pressure being continued as long as said source of supply pressure and said nozzle are connected; second signal responsive means for biasing said valve toward closure when a negative feedback signal is applied to said second signal responsive means; and means for deriving a negative feedback signal indicative of the number of serial pulses generated by said flapper and nozzle and for applying said negative feedback signal to said second signal responsive means.

15. A pneumatic device adapted to generate on signal one or more pulses each consisting of an increase in pressure followed by a decrease in pressure comprising: a source of supply pressure; a nozzle adapted to exhaust to atmosphere; a valve disposed intermediate said source of supply pressure and said nozzle for selectively connecting the same; a pressure operated variable restrictor disposed upstream of said nozzle for restricting the flow of pneumatic fluid thereto; a flapper biased into seating engagement with said nozzle; first pressure responsive means for opening said valve to connect said source of supply pressure to said nozzle upon sensing a predetermined pressure signal, said variable restrictor being adapted to open an amount proportional to the magnitude of said predetermined pressure signal whereby the flow through said variable restrictor is proportional to the magnitude of said signal, the pressure in said nozzle increasing when said valve is in an open position to force said flapper into a disengaged position whereby the nozzle is exhausted to atmosphere and the pressure therein is reduced, said flapper returning to its seated position with said reduction in pressure, the pulses constituting the increase in pressure and then decrease in pressure being serially continued as long as said source of supply pressure and said nozzle are connected; means for applying said predetermined pressure signal to said variable restrictor and to said first pressure responsive means; second pressure responsive means for biasing said valve toward closure when a negative feedback pressure signal is applied to said second pressure responsive means; and means for deriving a negative feedback pressure signal incrementally indicative of the number of said serial pulses and for applying said negative feedback pressure signal to said second signal responsive means; said second pressure responsive means being adapted to accumulate increments of said negative feedback pressure signal so as to successively increase bias on said valve until said valve is closed.

16. A pneumatic device adapted to generate on signal one or more pulses each consisting of an increase in pressure followed by a decrease in pressure comprising: a source of supply pressure; a nozzle adapted to exhaust to atmosphere; a valve disposed intermediate said source of supply pressure and said nozzle for selectively connecting the same; a pressure operated variable restrictor disposed upstream of said nozzle for selectively restricting the flow of pneumatic fluid to said nozzle; a flapper biased into seating engagement with said nozzle; first pressure responsive means for opening said valve to connect said source of supply pressure to said nozzle in response to a predetermined pressure signal, said variable restrictor being adapted to open an amount proportional to the magnitude of said predetermined pressure signal whereby the flow through said variable restrictor is proportional to the magnitude of said pressure signal, the pressure in said nozzle increasing when said nozzle is connected to said source of supply pressure to force said flapper into a disengaged position whereby the nozzle is exhausted to atmosphere and the pressure therein is reduced, said flapper returning to its seated position with said reduction in pressure, the pulses thereby generated being serially continued as long as said source of supply pressure and said nozzle are connected and at a rate which is a function of the magnitude of the opening of said variable restrictor valve; means for applying said predetermined pressure signal to said variable restrictor and to said first pressure responsive means; second pressure responsive means for biasing said valve toward closure when a negative feedback pressure signal is applied to said second pressure responsive means; and means for deriving a negative feedback pressure signal having an incremental magnitude indicative of the number of said serial pulses and for applying said negative feedback pressure signal to said second pressure responsive means, said second pressure responsive means being adapted to accumulate magnitude increments of said negative feedback pressure signal so as to successively increase bias on said valve until said valve is closed.

17. A pneumatic device adapted to generate on signal one or more pulses each consisting of an increase in pressure and a decrease in pressure comprising: a source of supply pressure; a nozzle adapted to exhaust to atmosphere; a valve disposed intermediate said source of supply pressure and said nozzle for selectively connecting the same; a pressure operated variable restrictor disposed upstream of said nozzle for selectively restricting the flow of pneumatic fluid to said nozzle; a flapper biased into seating engagement with said nozzle; first pressure responsive means for opening said valve to connect said source of supply pressure to said nozzle in response to a predetermined pressure signal, said variable restrictor being adapted to open an amount proportional to the magnitude of said predetermined pressure signal whereby the flow through said variable restrictor is a function of the magnitude of said pressure signal, the pressure in said nozzle increasing when said nozzle is connected to said source of supply pressure to force said flapper into a disengaged position whereby the nozzle is exhausted to atmosphere and the pressure therein is reduced, said flapper returning to its seated position with said reduction in pressure, the pressure pulses thereby generated being serially continued as long as said source of supply pressure and said nozzle are connected and at a rate which is a function of the magnitude of the opening of said variable restrictor valve; means for applying said predetermined pressure signal to said variable restrictor and to said first pressure responsive means; second pressure responsive means for biasing said valve toward closure when a negative feedback pressure signal is applied to said second pressure responsive means; means including a variable pressure output valve for deriving a negative feedback pressure signal having an incremental magnitude successively indicative of the number of said serial pulses and for applying said negative feedback pressure signal to said second pressure responsive means, said second pressure responsive means being adapted to accumulate successive magnitude increments of said negative feedback pressure signal so as to successively increase bias on said valve until said valve is closed.

18. A pneumatic device adapted to generate on signal one or more pulses each consisting of an increase in pressure followed by a decrease in pressure comprising: a source of supply pressure; a nozzle adapted to exhaust to atmosphere; a valve disposed intermediate said source of supply pressure and said nozzle for selectively connecting the same; a pressure operated variable restrictor disposed intermediate said valve and said nozzle; a flapper biased into seating engagement with said nozzle; a first bellows connected to said variable restrictor such that flexure of said first bellows causes said valve to be correspondingly operated, said first bellows being adapted to flex in response to a predetermined pressure signal, said variable restrictor being adapted to be opened an amount proportional to the magnitude of said predetermined pressure signal whereby the flow through said variable restrictor is a function of the magnitude of said predetermined pressure signal, the pressure in said nozzle increasing when said nozzle is connected to said source of supply pressure so as to force said flapper into an unseated position whereby said nozzle is exhausted to atmosphere and the pressure therein is reduced, said flapper returning to its seated position with said reduction in pressure, the pressure pulses thereby generated being serially continued as long as said source of supply pressure and said nozzle are connected and at a rate which is a function of the magnitude of the opening of said variable restrictor; means for applying said predetermined pressure signal to said variable restrictor and to said first bellows; a second bellows mounted in opposing relationship to said first bellows for biasing said valve toward closure when a negative feedback pressure signal is applied to said second bellows; and means including a variable pressure output valve for deriving a negative feedback pressure signal having an incremental magnitude indicative of the number of said serial pulses and for applying said negative feedback pressure signal to said second bellows, said second bellows being adapted to accumulate magnitude increments of said negative feedback pressure signal so as to successively increase bias on said valve until said valve is closed.

No references cited.

ALAN COHAN, *Primary Examiner.*